(12) United States Patent
Verhoest et al.

(10) Patent No.: US 10,501,213 B2
(45) Date of Patent: Dec. 10, 2019

(54) FEEDER UNIT, FEEDER MODULE COMPRISING FEEDER UNITS, AND METHOD FOR DISCHARGING A CONSTANT MASS FLOW OF ONE OR MORE POWDERS INTO A RECEIVING CONTAINER

(71) Applicant: GEA Process Engineering nv, Halle (BE)

(72) Inventors: Bart Peter Verhoest, Niel (BE); Alexander Clemens Henricus Josef Schaepman, Breda (NL); Johannes Adrianus Jozef Maria Vugts, Gravenmoer (NL)

(73) Assignee: GEA Process Engineering nv, Halle (BE)

( * ) Notice: Subject to any disclaimer, the term of this patent is extended or adjusted under 35 U.S.C. 154(b) by 93 days.

(21) Appl. No.: 15/640,654

(22) Filed: Jul. 3, 2017

(65) Prior Publication Data
US 2017/0334583 A1 Nov. 23, 2017

Related U.S. Application Data

(63) Continuation of application No. 14/404,972, filed as application No. PCT/IB2012/052803 on Jun. 4, 2012, now abandoned.

(51) Int. Cl.
*G01G 11/08* (2006.01)
*G01G 13/06* (2006.01)
(Continued)

(52) U.S. Cl.
CPC ............... *B65B 1/04* (2013.01); *B01F 1/00* (2013.01); *B29B 7/244* (2013.01); *B29B 7/28* (2013.01);
(Continued)

(58) Field of Classification Search
CPC ...... G01G 11/08; G01G 13/006; G01G 17/00; B65B 1/04; B65B 1/32; B29B 7/244; B29B 7/28; B29B 7/603; B29B 7/72
See application file for complete search history.

(56) References Cited

U.S. PATENT DOCUMENTS 4,762,252 A * 8/1988 Hyer .................... G01G 13/248
177/121
4,815,042 A 3/1989 Pratt
(Continued)

FOREIGN PATENT DOCUMENTS

CN 1645068 A 5/2007
CN 201045587 Y 4/2008
(Continued)

OTHER PUBLICATIONS

European Search Report for EP19150215 dated Apr. 10, 2019.
(Continued)

*Primary Examiner* — Randy W Gibson
(74) *Attorney, Agent, or Firm* — Gregory L. Mayback; Dickinson Wright PLLC

(57) ABSTRACT

A method for processing pharmaceutical powders, which comprises providing a feeder module including a plurality of feeder units each with a storage hopper, a weighing cell, a conveyer, and a discharge end, connecting the storage hopper to a refilling system with a refilling valve, connecting the refilling valve to a level or weight indicator disposed above the refilling valve, connecting the discharge end to a common receiving container, refilling the storage hopper with a powder intermittently 40 to 80 times per hour, storing data during refilling, transporting powder from the storage hopper with the respective conveyer, and discharging powder from each feeder unit into the common receiving container. During each refilling of the storage hopper, the refilling valve dispenses powder into the storage hopper and, during the step of transporting the powder from the storage hopper, the conveyer is operated according to the data collected during previous refills.

27 Claims, 15 Drawing Sheets

(51) Int. Cl.
*G01G 17/00* (2006.01)
*B29B 7/28* (2006.01)
*B29B 7/72* (2006.01)
*B65B 1/04* (2006.01)
*G01G 13/00* (2006.01)
*B65B 1/32* (2006.01)
*B29B 7/24* (2006.01)
*B29B 7/60* (2006.01)
*G01G 19/393* (2006.01)
*B01F 1/00* (2006.01)

(52) U.S. Cl.
CPC ............... *B29B 7/603* (2013.01); *B29B 7/72* (2013.01); *B65B 1/32* (2013.01); *G01G 11/08* (2013.01); *G01G 13/006* (2013.01); *G01G 17/00* (2013.01); *G01G 19/393* (2013.01)

(56) References Cited

U.S. PATENT DOCUMENTS

| | | | |
|---|---|---|---|
| 5,006,995 A | 4/1991 | Toschi et al. | |
| 5,132,897 A * | 7/1992 | Allenberg | G01G 11/086 177/59 |
| 5,143,166 A | 9/1992 | Hough | |
| 5,148,943 A | 9/1992 | Moller | |
| 5,192,938 A | 3/1993 | Ort | |
| 5,273,584 A | 12/1993 | Keller | |
| 5,340,211 A | 8/1994 | Pratt | |
| 5,423,455 A * | 6/1995 | Ricciardi | G01G 11/086 141/1 |
| 5,665,941 A * | 9/1997 | Wehhofer | G01G 11/086 177/116 |
| 5,738,153 A | 4/1998 | Gerling et al. | |
| 5,753,868 A | 5/1998 | Diem | |
| 5,906,294 A | 5/1999 | Ikeya et al. | |
| 6,056,027 A | 5/2000 | Patterson | |
| 6,098,847 A * | 8/2000 | Vollmar | G01G 19/32 222/142 |
| 6,168,305 B1 * | 1/2001 | Marmsater | G01G 11/086 177/25.13 |
| 6,284,987 B1 | 9/2001 | Al-Modiny | |
| 6,911,607 B2 * | 6/2005 | Klijn | B01F 5/26 177/116 |
| 6,966,456 B2 | 11/2005 | Margalit | |
| 7,301,110 B2 | 11/2007 | Hansen | |
| 7,311,223 B2 | 12/2007 | Post | |
| 7,534,970 B2 | 5/2009 | Tump | |
| 9,057,640 B1 * | 6/2015 | Kreutzer | G01G 11/08 |
| 10,138,075 B2 * | 11/2018 | Maguire | B65G 53/24 |
| 2002/0157877 A1 | 10/2002 | Takahashi | |

FOREIGN PATENT DOCUMENTS

| | | |
|---|---|---|
| EP | 0275834 A1 | 12/1987 |
| EP | 290999 B1 | 5/1988 |
| JP | 60-141394 | 3/1987 |
| JP | 62049734 | 3/1987 |
| JP | S62-184434 U | 8/1987 |
| JP | 61-72828 | 1/1993 |
| JP | 05001788 | 1/1993 |
| WO | 86/06161 | 10/1986 |
| WO | 2003020499 | 3/2003 |
| WO | 2010128359 A1 | 11/2010 |

OTHER PUBLICATIONS

Examination Report for India App. No. 11260/DELNP/2014 dated Oct. 17, 2018.
International Search Report for PCT/IB2012/052803 dated May 17, 2013.
K-Tron: "K-Tron Soder Product SpecificationTwin-screw Compact WeighFeeder—K-CL-24-KT", internet May 2, 2002, (May 2, 2002), XP002693562, Retrieved from the Internet: URL: http://www.bucher.com.br/pdfs/news/ dosadores_gavimetricos/dosador_gravimetrico_k_cl_sfs_mt12.pdf [retrieved on Nov. 3, 2013].
K-Tron: "Smart Refill Technology in Loss-in-weight Feeding", internet,, Nov. 8, 2011 (Nov. 8, 2011), XP002693589, Retrieved from the Internet: URL:http://www.ptonline.com/cdn/cms/uploadedFiles/Ktron-Smart_Refill. pdf [retrieved on Dec. 12, 2013] last par. of left column to second par. central column in p. 5; figures 4,5.

* cited by examiner

FEEDER UNIT, FEEDER MODULE COMPRISING FEEDER UNITS, AND METHOD FOR DISCHARGING A CONSTANT MASS FLOW OF ONE OR MORE POWDERS INTO A RECEIVING CONTAINER

CROSS-REFERENCE TO RELATED APPLICATIONS

This application is:
a continuation of U.S. patent application Ser. No. 14/404,972, filed on Feb. 6, 2015, which application claimed the priority, under 35 U.S.C. §§ 119, 120, 363, and 371, of International Application No. PCT/IB2012/052803, filed Jun. 4, 2012, which designated the United States and was published in English, the prior applications are herewith incorporated by reference in their entireties.

STATEMENT REGARDING FEDERALLY SPONSORED RESEARCH OR DEVELOPMENT

Not Applicable

FIELD OF THE INVENTION

The present invention relates to a feeder unit comprising a storage hopper, a weighing cell, a conveyer, and a discharge end, the storage hopper being adapted to be connected to a refilling system, and the discharge end to a receiving container, a working space being defined by the arithmetic product of dead weight of the feeder unit and the refilling interval. The invention furthermore relates to a feeder module comprising a plurality of feeder units, and a method for discharging a constant mass flow of one or more powders into a receiving container.

BACKGROUND OF THE INVENTION

Within the pharmaceutical industry there is an increasing interest in providing products of a higher quality, and a number of guidelines and regulations have been formulated during recent years to establish proper quality measurement, analysis and control.

In addition to improving the processing efficiency and quality there is a general interest in providing processes that are both environmentally safer and also pose a reduced risk to an operator of the process. In particular, in a process to produce for instance tablets from active pharmaceutical ingredients (API) and various excipients in a powdery form may require the operator to wear a protective breathing apparatus, or otherwise personal protective equipment, like gloves or coverall, to prevent excessive exposure to the API and also the excipients. Reduction of the risk of contamination of the surrounding environment as well as exposure of the operator to a pharmaceutical product in a tabletting process was addressed in WO03/020499 (Courtoy), wherein a rotary tablet press was described. However, WO03/020499 does not take fully into account the interest in providing better process control.

Typical manufacturing processes hitherto employed within the pharmaceutical field are of a batch nature. Batch manufacturing processes have a number of advantages and provide satisfactory results within many areas. However, due the increasingly widespread application of regulated criteria for monitoring and controlling in particular pharmaceutical manufacturing processes, and to the general increase in the demands to quality by design, the level of quality of monitoring and control attainable by a batch process is often not sufficient, i.e., due to the fact that settings are fixed. Furthermore, a relatively large buffer volume is required, entailing undesired back-mixing of the material stream. As a consequence, manufacturers' and customers' focus of interest has shifted to continuous processes, in which settings may be varied and are allowed to change within a design space. In order to achieve more production output with a batch process, bigger equipment and bigger buffer volumes, with different process settings to attain the same output, would be required. This is known as the scale-up problem. More output with a continuous process just requires longer running, with the ability to maintain the same settings. Furthermore, there is an increased interest for more robust processing equipment and for the ability to control more incoming variation, while maintaining tablet quality. Special precautions have to be taken in order to ensure traceability in a continuous process, just as the requirements to accuracy and control within the framework of for instance the PAT (Process Analytical Technology) devised by United States Food and Drug Administration (FDA).

Some examples of continuous processes have been devised in the prior art, for instance in EP 0 275 834 A1, in which two or more ingredients are fed into the process line at various feed or inlet points, and the ingredients are mixed, dried and subsequently compacted in a conventional tabletting machine. The process line includes a first mixing unit, a drying unit, a sizing unit and a second mixing unit.

Ideally, the output corresponds to the aggregated input of ingredients at the feed or inlet points, i.e. all of the material is fed to the manufacturing machine in a continuous flow and at a constant rate. Due to a variety of factors, this is not feasible in practice. First, it is under any circumstances almost impossible to adjust the output from the mixing and drying units to provide a just-in-time supply of material to the tabletting machine. Second, the continuous production of tablets of a desired high level of quality requires careful monitoring, controlling and adjustment of process parameters in order to avoid a large rejection number from the tabletting machine. This may lead to accumulation of material along the process line awaiting adjustment of certain process parameters. In turn, this inevitably necessitates the use of intermediate buffer vessels in order to store material upstream of the tablet press.

In a more recent document, WO 2010/128359 (GEA Pharma Systems), a contained module being able to operate by a fully continuous process for the production of tablets is devised. By this design of the tablet production module, all units of the tabletting process may be contained, thus reducing the risk of operator exposure and facilitating operation of the tablet press, as all preparations of the material stream fed to the tablet press are carried out in a contained and controlled manner. The term "contained" is defined by its level of containment according to suitable measurements, and is defined as at least dust-tight.

Common to the above modules and processes is that one or more mixing units are utilized. The term "mixing unit" should in this context be understood in its broadest terms. Thus, the mixing unit refers to a unit operation generally capable of mixing or otherwise processing one, two or more components into a desired form. The mixing unit may thus also be capable of modifying the physical form of dry component(s) processed in the mixing unit, e.g. a feed stream of powder(s) may be converted to a granulate comprising the component(s). The mixing unit may be a granulator for making a granulate from dry powders, such as a granulator to which a granulating liquid is added, or a roller compactor. Further examples include a twin screw blender and a twin screw granulator. Furthermore, the mixing unit may include such equipment as a dryer, a dry blender, a continuous dry blender or the like.

Dispensing or dosing the component(s) to the mixing unit, or to a receiving container upstream of the mixing unit, most often takes place from storage hoppers connected to feeders which in turn supply the mixing unit or receiving container with the desired amount of powder(s) or other component(s). Feeding of powders is carried out by means of screw conveyors according to one of two main solutions: volumetric feeding or gravimetric feeding. In volumetric feeding, material held in a hopper is fed into a process at a constant volume per unit of time, whereas in gravimetric feeding, material is fed into a process at a constant weight per unit of time. The weight is measured by a weighing cell. Gravimetric feeders may operate on the loss-in-weight principle, which provides for more accurate dosing than feeders operating on other principles.

In particular in the processing of pharmaceutical products, accurate dispensing or dosing of the powders involved is vital, and loss-in-weight feeders are traditionally utilized.

One example of prior art concerned with achieving an increased accuracy when feeding powders is EP 290 999 B 1, in which powders are fed from storage hoppers to a weighing hopper and further to a mixing or preparation container.

Many existing loss-in-weight feeders thus function well but are often relatively voluminous and heavy, and require certain conditions with respect to for instance the installation conditions in the production area.

Even with all of the above-mentioned provisions, there is still a need for increasing the quality and operating conditions.

Thus, a need exists to overcome the problems with the prior art systems, designs, and processes as discussed above.

SUMMARY OF THE INVENTION

On this background, it is an object of the present invention to provide a feeder unit, by which the accuracy is improved, while simultaneously fulfilling the demands to flexibility and the overall operational conditions as regards a reduced risk of exposure of the operator.

In a first aspect, this and further objects are met by a feeder unit of the kind mentioned in the introduction which is furthermore characterized in that the working space (ws) is below 0.2 kgh.

By this design, the feeder unit is able to dispense a very accurately measured amount of material into a receiving container. Relative to feeder units having a higher dead weight and usually a lower refill interval, it is possible to obtain a higher accuracy in the measurement because of the lower dead weight of the feeder unit. Loss in-weight-feeders known in the art typically weigh up 20-100 kg. Consequently, a higher inaccuracy is present because the loss in weight is so small, typically 0.05-0.1 g, and the weight of the feeder unit is included in weight measurement.

In a preferred embodiment, the working space (ws) is below 0.1 kgh. By reducing the working space even more, an even higher accuracy is obtained. In one development of the preferred embodiment, the dead weight of the feeder unit lies in the range 1 to 8 kg, preferably 1 to 6 kg, more preferably 1 to 3 kg. Additionally or alternatively, the storage hopper may have a predefined volume to define a capacity of the storage hopper below 10 liters, preferably below 5liters, most preferably below 3 liters. Furthermore, the maximum net weight of powder in the storage hopper may lie in the interval 50 g to 5000 g and the working space may be below 0.2 kgh, preferably below 0.1 kgh, most preferred below 0.05 kgh.

All these factors contribute to reducing the dead weight of the feeder unit, and thereby increasing the accuracy of the measurement.

The feeder unit may comprise a refilling valve connected to the storage hopper and a level or weight indicator above the refilling valve for controlled predosing of a refill amount. By using a refilling valve instead of merely loading an unknown amount of powder into the receiving container, it is possible to recreate the same loading conditions each time, which makes it possible to collect data on the output of the discharge end and thereby in further production runs adjust the speed of the conveyer accordingly.

In order to increase the accuracy even further, a controller adapted to store a conveying parameter together with a level or a weight may be provided.

The weighing cell may be any weighing cell fulfilling the demands to accuracy on that point and preferably, the weighing cell is with Electro Magnetic Force Restoration (EMFR).

In order to allow for detachment of parts of each feeding unit relative to other parts, it is advantageous that the storage hopper, the conveyer and the discharge end of each feeder unit are releasably connected to the weighing cell.

The powder may in principle be transported or pumped from the storage hopper to the receiving container in any suitable manner. In a preferred embodiment, the conveyer is a twin screw conveyor.

In one development of this preferred embodiment, at least one, preferably both, of the screws of the twin screw conveyor has a variable pitch along its length underneath the storage hopper.

In a further development, at least one, preferably both, of the screws has a variable diameter along its length underneath the storage hopper. The variable diameter assures that the whole length of at least one screw, or of both screws, under the hopper is evenly loaded and hereby creating an even transport volume over the section of the hopper.

In one preferred embodiment, the feeder unit comprises a controller for processing weight signals and compensate for external forces.

The feeder unit may further comprise a sensor for sensing material variations.

With a particular view to obtaining maximum operator security and isolation of the powder from the surroundings, the storage hopper, the conveyer, and the discharge end of the feeder unit are contained and isolated from the weighing cell.

In another aspect, a feeder module comprising a plurality of feeder units is provided, wherein five to eight feeder units are arranged in a spokes-like configuration, each feeder unit extending radially outwards from an imaginary inner circle defined at the discharge end adapted to face the common receiving container to an imaginary outer circle defined by radially opposite end of each feeder unit, the feeder units being positioned substantially on radii extending from the imaginary inner circle. Although the feeder unit according to the invention may be utilized independently, it may thus form part of a feeder module which also benefits from the greater accuracy obtained.

In a third aspect of the invention, a method for discharging a constant mass flow of one or more powders into a receiving container is provided, said method being suitable for being operated in a feeder unit of the first aspect, said method comprising the steps of:

providing a feeder unit with a storage hopper, a weighing cell, a conveyer, and a discharge end, connecting the storage hopper to a refilling system with a refilling valve, connecting the refilling valve to a level or weight indicator, the level or weight indicator being above the refilling valve, connecting the discharge end to a receiving container, refilling the storage hopper intermittently at predefined intervals, storing data during refilling, wherein during refilling, the refilling valve dispenses the same amount of powder into the storage hopper, and the conveyer is operated according to the data collected during previous refills.

By connecting a refilling valve instead of merely loading an unknown amount of powder into the receiving container, it is possible to recreate the same loading conditions each time, which makes it possible to collect data on the output of the discharge end and thereby in further production runs adjust the speed of the conveyer accordingly. By storing data during refilling, by ensuring that during refilling, the refilling valve dispenses the same amount of powder into the storage hopper, and by operating the conveyer according to the data collected during previous refills, a substantial increase of the accuracy is obtained, as any effects of refilling are reduced or eliminated.

With the foregoing and other objects in view, there is provided, a method for processing pharmaceutical powders which comprises the steps of providing a feeder module including a plurality of feeder units, providing each feeder unit with a storage hopper, a weighing cell, a conveyer, and a discharge end, connecting the storage hopper of each feeder unit to a refilling system with a refilling valve, connecting the refilling valve to at least one of a level or weight indicator disposed above the refilling valve, connecting the discharge end of each feeder unit to a common receiving container, refilling the storage hopper of each feeder unit with a powder intermittently 40 to 80 times per hour, storing data about the powder filled in the feeder unit during refilling, transporting powder from the storage hopper of each feeder unit with the respective conveyer, and discharging powder from each feeder unit into the common receiving container. During each refilling of the storage hopper of each feeder unit, the respective refilling valve dispenses approximately the same amount of the powder into the storage hopper and during the step of transporting the powder from the storage hopper of each feeder unit, the conveyer is operated according to the data collected during previous refills.

In accordance with another mode, the storage hopper is refilled 50 to 70 times per hour.

In accordance with a further mode, a stabilizing time of the feeder module is defined and the stabilizing time after each refill is in the range of 2 to 4 seconds.

In accordance with an added mode, the storage hopper of each feeder unit is provided with a predefined volume to define a capacity of below 10 liters.

In accordance with an additional mode, the maximum volume of powder in the storage hopper in each feeder unit lies in the range of 1.6 to 2 liters.

In accordance with yet another mode, the powder is transported from the storage hopper of each feeder unit to the receiving container at a predefined maximum flow rate of below 100 liters per hour.

In accordance with yet a further mode, a maximum refilling interval in h is defined by a ratio of a volume of the storage hopper and a maximum flow rate.

In accordance with yet an added mode, each feeder unit is provided with a dead weight in a range of 1 to 8 kg.

In accordance with yet an additional mode, a working space in kgh is defined by an arithmetic product of the dead weight in kg of each feeder unit and the refilling interval in h and the working space is below 0.2 kgh. In an exemplary embodiment, the working space is below 0.1 kgh.

In accordance with again another mode, the receiving container is connected to a granulator and further comprising the step of granulating the mixture of the one or more powders to provide a granulated mixture.

In accordance with again a further mode, the receiving container is connected to a tablet press and further comprising the step of tabletting the mixture of the one or more powders or granulated mixture to provide a tabletted pharmaceutical product.

With the objects in view, there is also provided a feeder module for use in the method, the feeder module comprising a plurality of feeder units, each feeder unit including a storage hopper, a weighing cell, a conveyer, and a discharge end, a refilling system including a refilling valve and at least one of a level or weight indicator disposed above the refilling valve, the refilling system being connected to the storage hopper of each feeder unit, a common receiving container connected to the discharge end of each feeder unit, and the plurality of feeder units are two to eight feeder units disposed in a spokes-like configuration, each feeder unit extending radially outwards from an imaginary inner circle defined by the discharge ends of the feeder units in the common receiving container to an imaginary outer circle defined by radially opposite ends of the feeder units, the feeder units being positioned substantially on radii extending from the imaginary inner circle.

In accordance with again an added mode, there is provided a controller programmed to store a conveying parameter together with at least one of a level or a weight.

In accordance with still another mode, the weighing cell of each feeder unit is a weighing cell with Electro Magnetic Force Restoration (EMFR).

In accordance with still a further mode, the storage hopper, the conveyer, and the discharge end of each feeder unit are releasably connected to the weighing cell.

In accordance with still an added mode, at least one of the conveyers of the feeder units are twin screw conveyers.

In accordance with still an additional mode, at least one of the screws of the twin screw conveyer has a variable pitch along its length underneath the storage hopper, at least one of the screws has a variable diameter along its length underneath the storage hopper, and/or both of the screws have a variable diameter along its length underneath the storage hopper.

In accordance with another mode, there is provided a controller programmed to process weight signals and compensate for external forces.

In accordance with a further mode, there is provided a sensor configured to sense material variations.

In accordance with an added mode, the storage hopper, the conveyer, and the discharge end of the feeder unit are contained and isolated from the weighing cell.

In accordance with an additional mode, the discharge end of each feeder unit is connected to the receiving container by a lay flat tube.

In accordance with yet another mode, each feeder unit has a pre-feeder element and which further comprises a lay flat tube between the storage hopper and the pre-feeder element of each feeder unit.

In accordance with again an additional mode, there is provided a casing around the storage hopper, the conveyer and the discharge end of each feeder unit.

In accordance with again an added mode, a diameter of the imaginary inner circle is smaller than a diameter of the receiving container.

In accordance with still another mode, there is provided an active vibration compensation scale integrated in the feeder module.

In accordance with a concomitant mode, the storage hopper is provided with a stirrer device.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which.

DETAILED DESCRIPTION OF THE EMBODIMENTS

Figure 1:
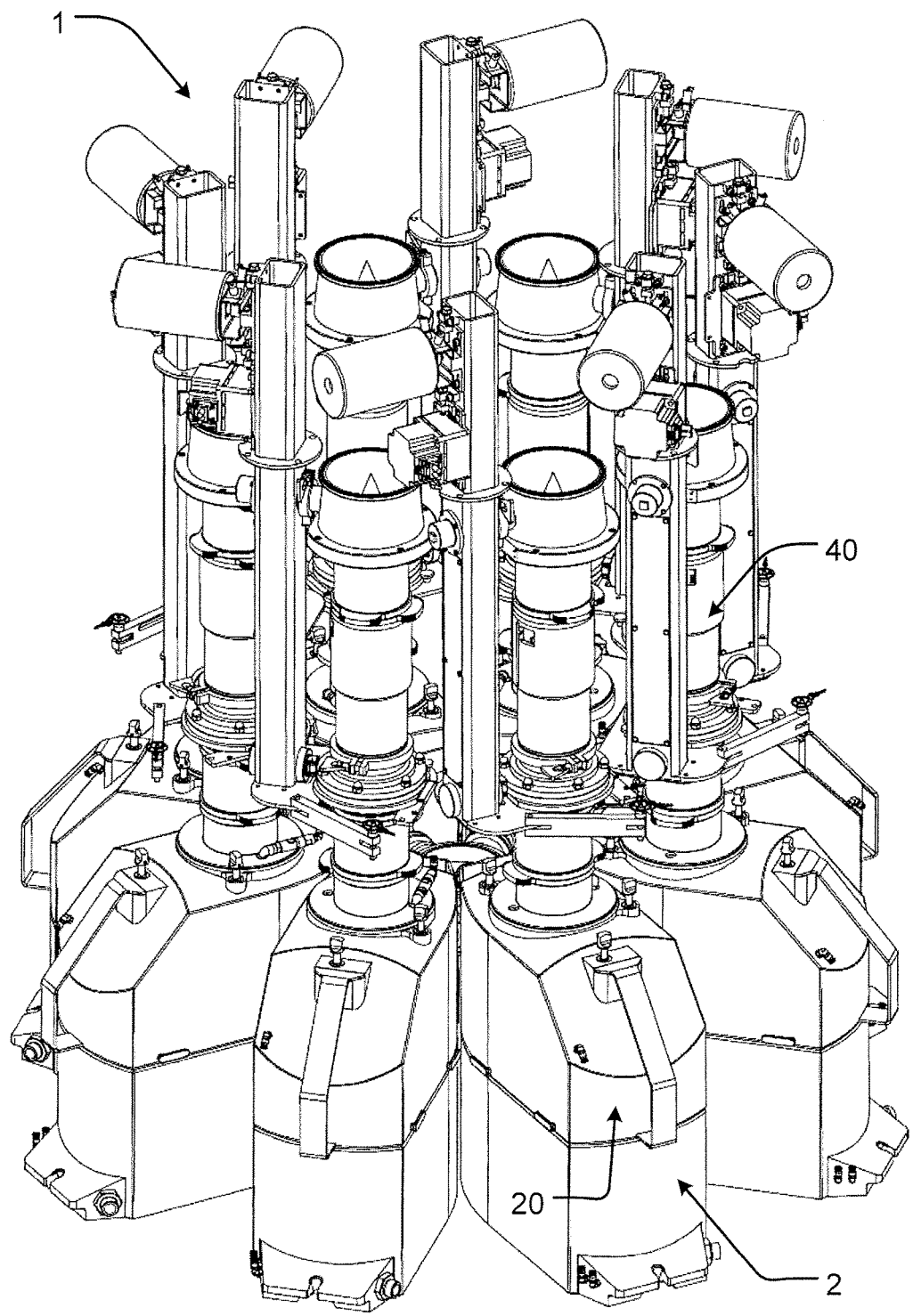
FIG. 1 shows a perspective view of an embodiment of a feeder module of the invention.
Figure 2:
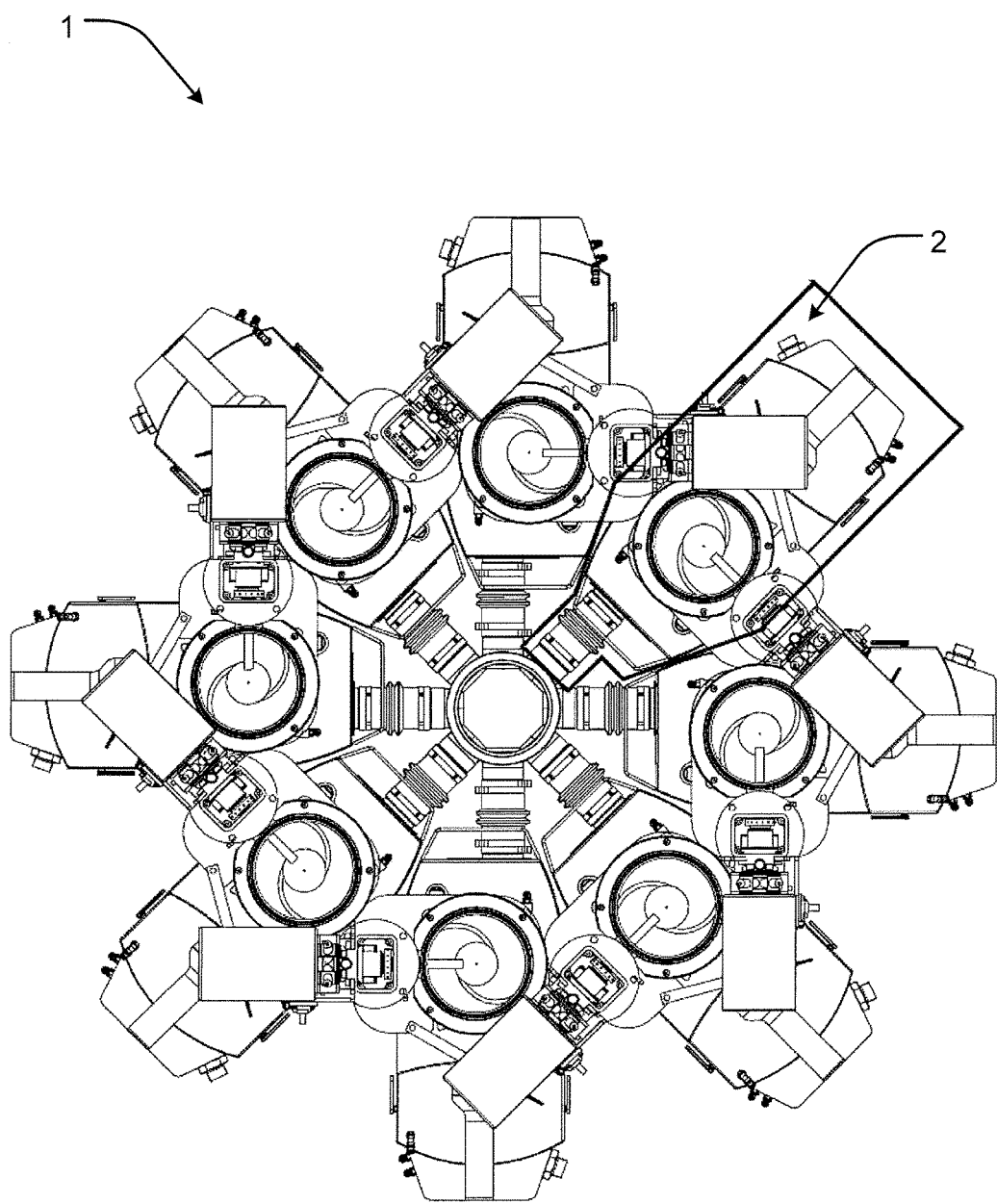
FIG. 2 shows a top plan view of the feeder module of FIG. 1.

Referring now to the Figures, a feeder module generally designated 1 is shown. In the embodiment shown, the feeder module 1 comprises a plurality of feeder units 2. Each feeder unit 2 comprises a feeder part 20 and a weighing cell. A pre-feeder element 40 is attached to the feeder part 20. In the embodiment shown in FIGS. 1 to 3, there are eight such feeder units 2. The feeder unit 2 according to the invention may also be used independently, as a single unit.

Figure 2A:
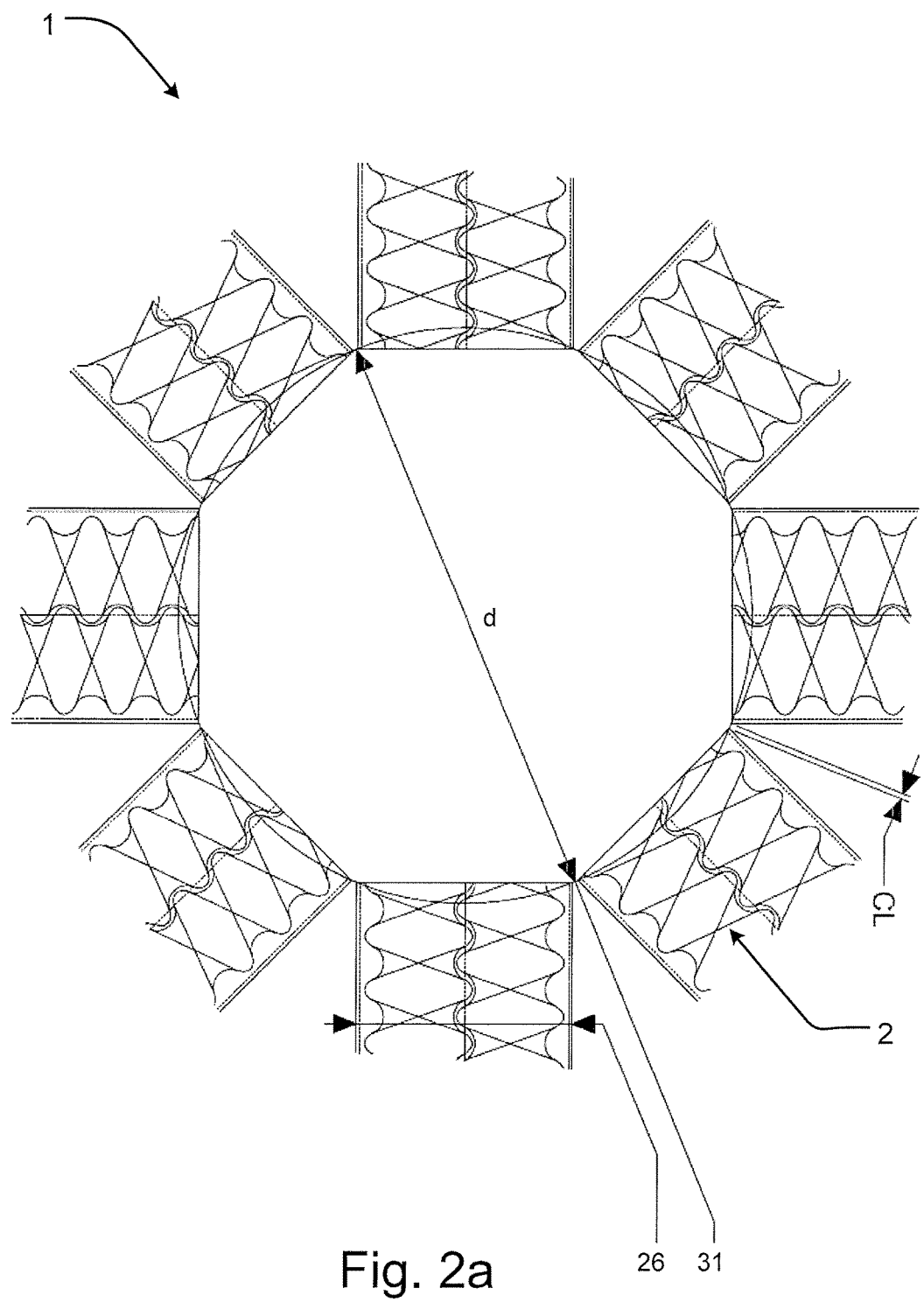
FIG. 2a shows a fragmentary, schematic overview corresponding to FIG. 2, in an embodiment comprising eight feeder units.
Figure 2B:
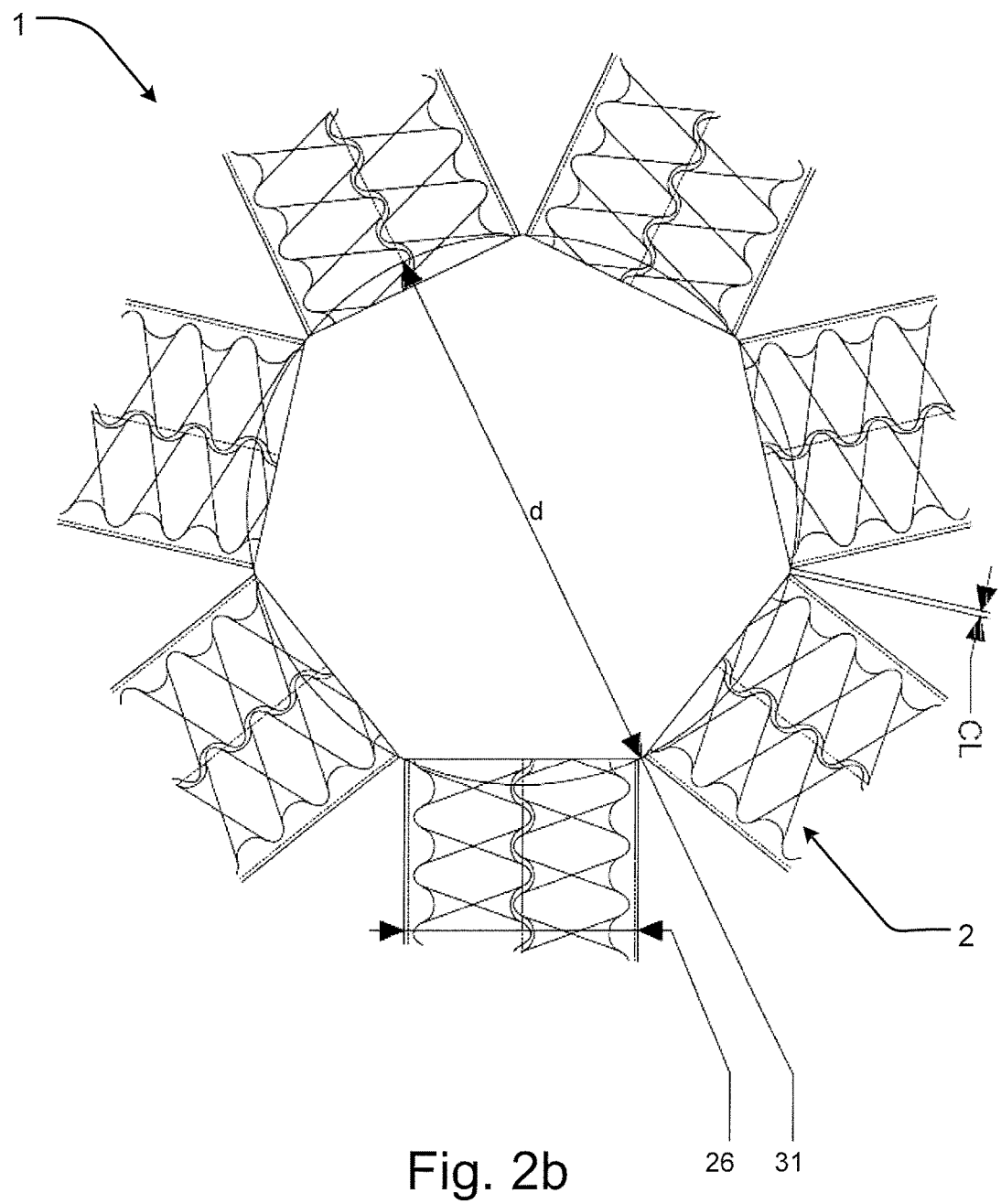
FIG. 2b shows a fragmentary, schematic overview corresponding to FIG. 2a, of another embodiment comprising seven feeder units.
Figure 2C:
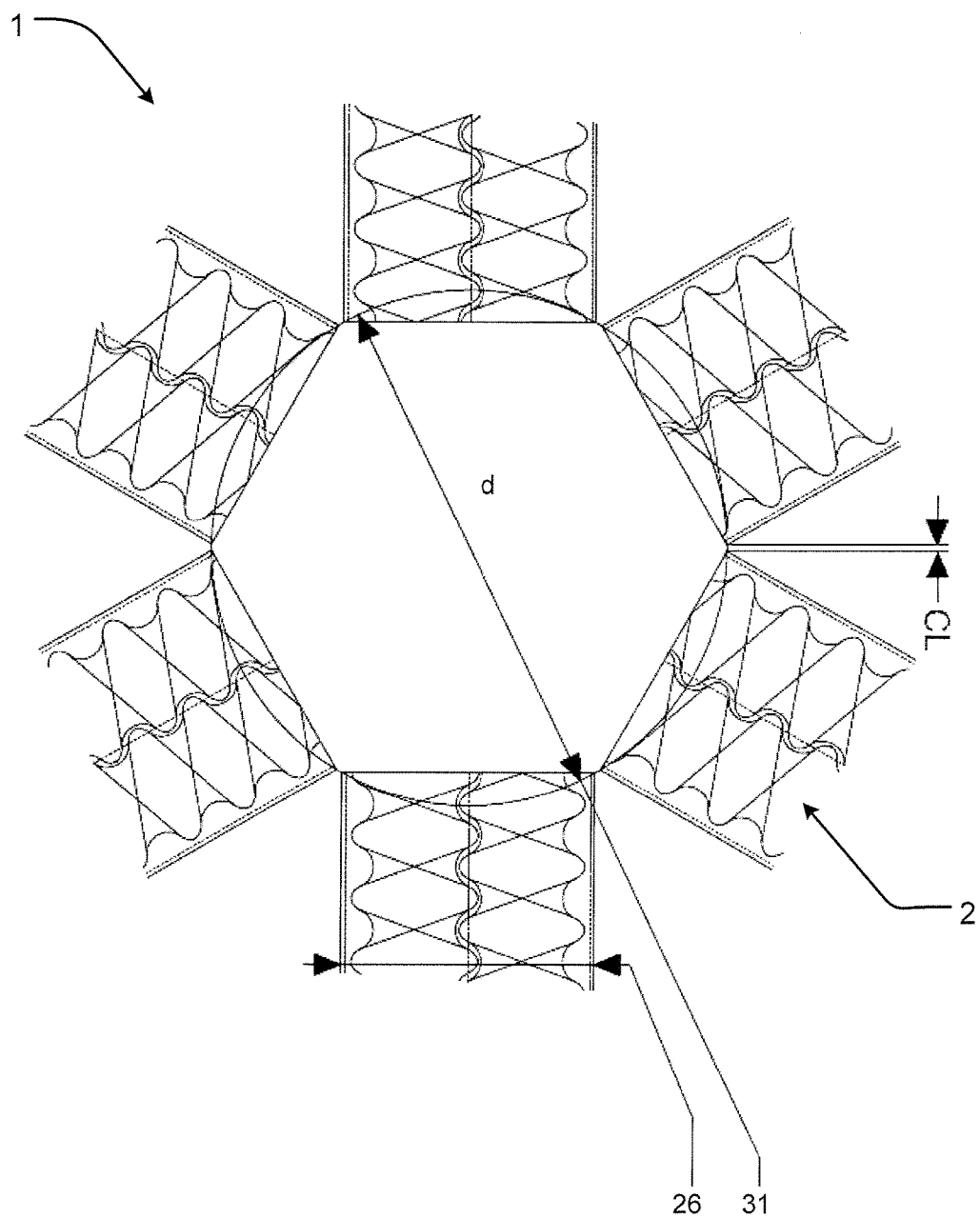
FIG. 2c shows a fragmentary, schematic overview corresponding to FIG. 2a, of further embodiment comprising six feeder units.
Figure 2D:
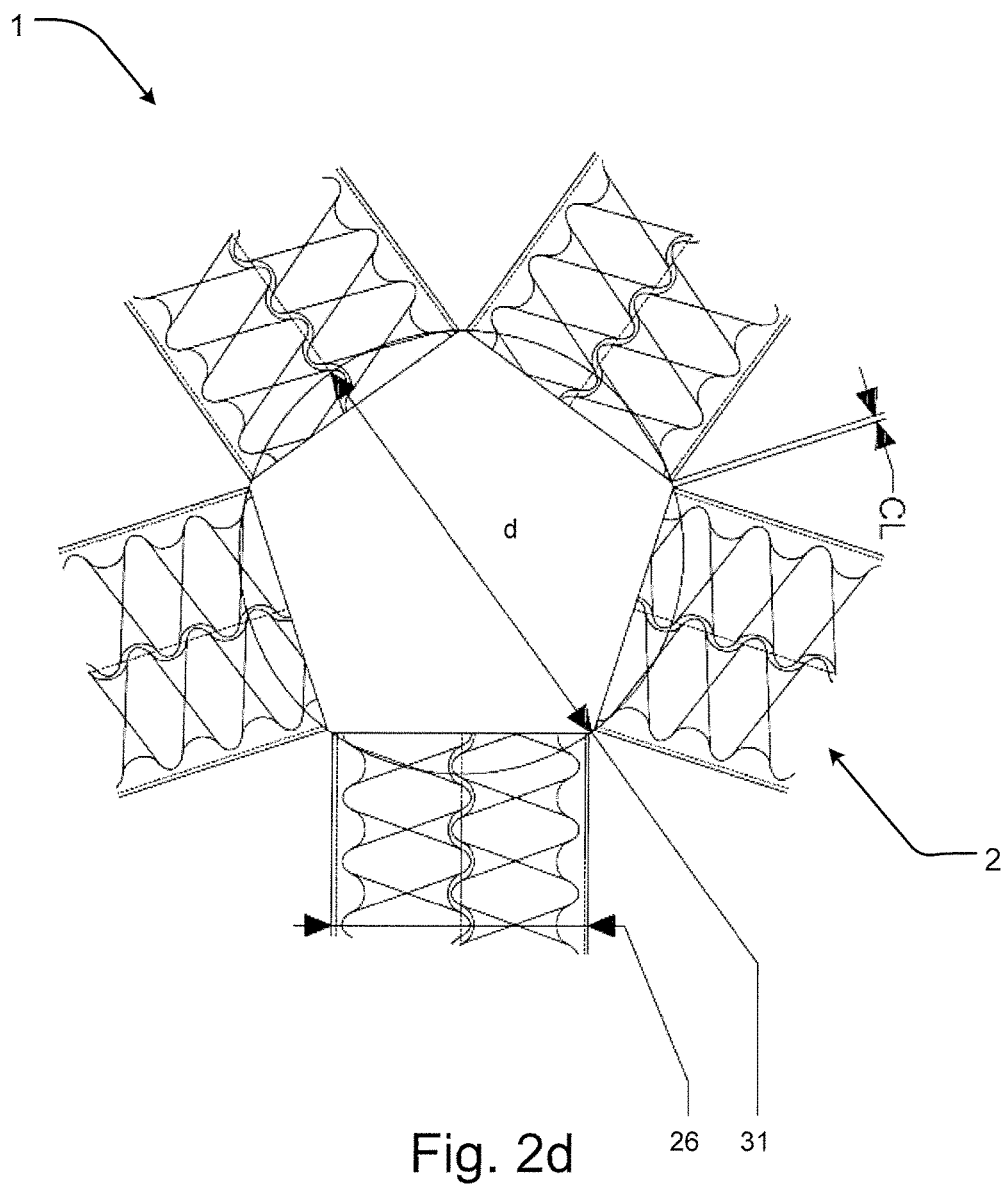
FIG. 2d shows a fragmentary, schematic overview corresponding to FIG. 2a, of further embodiment comprising five feeder units.

In one development of the preferred embodiment, the feeder module comprises five feeder units 2 and the diameter of the imaginary inner circle is 42-100 mm for a twin screw discharge tube (WDis) of 24 to 45 mm and a lateral clearance (CL) in between two twin screw discharge tubes of 1 to 10 mm, see FIG. 2d.

Alternatively, the feeder module may comprise six feeder units and the diameter of the imaginary inner circle is 50-120 mm for a twin screw discharge tube of 24 to 45 mm and a lateral clearance (CL) in between two twin screw discharge tubes of 1 to 10 mm. See FIG. 2c.

The feeder module comprises seven feeder units and the diameter of the imaginary inner circle is 57-140 mm for a twin screw discharge tube of 24 to 45mm and a lateral clearance (CL) in between two twin screw discharge tubes of 1 to 10 mm, see FIG. 2b.

As a further and preferred development, the feeder module comprises eight feeder units and the diameter of the imaginary inner circle is 65-150 mm for a twin screw discharge tube of 24 to 45 mm and a lateral clearance in between two twin screw discharge tubes of 1 to 10 mm, see FIG. 2a.

Figure 3:
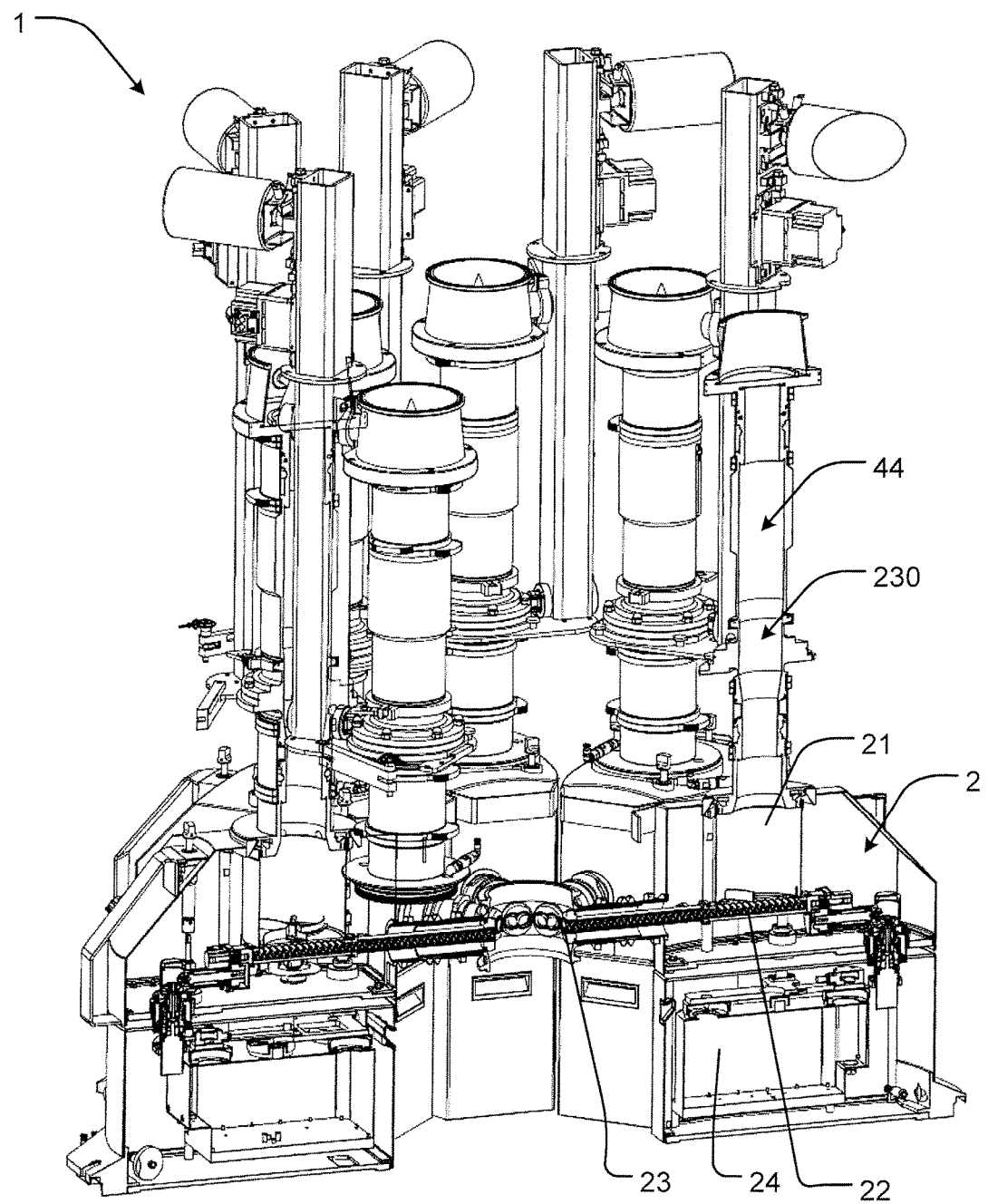
FIG. 3 shows a cross-sectional view of the feeder module of FIG. 1.
Figure 4:
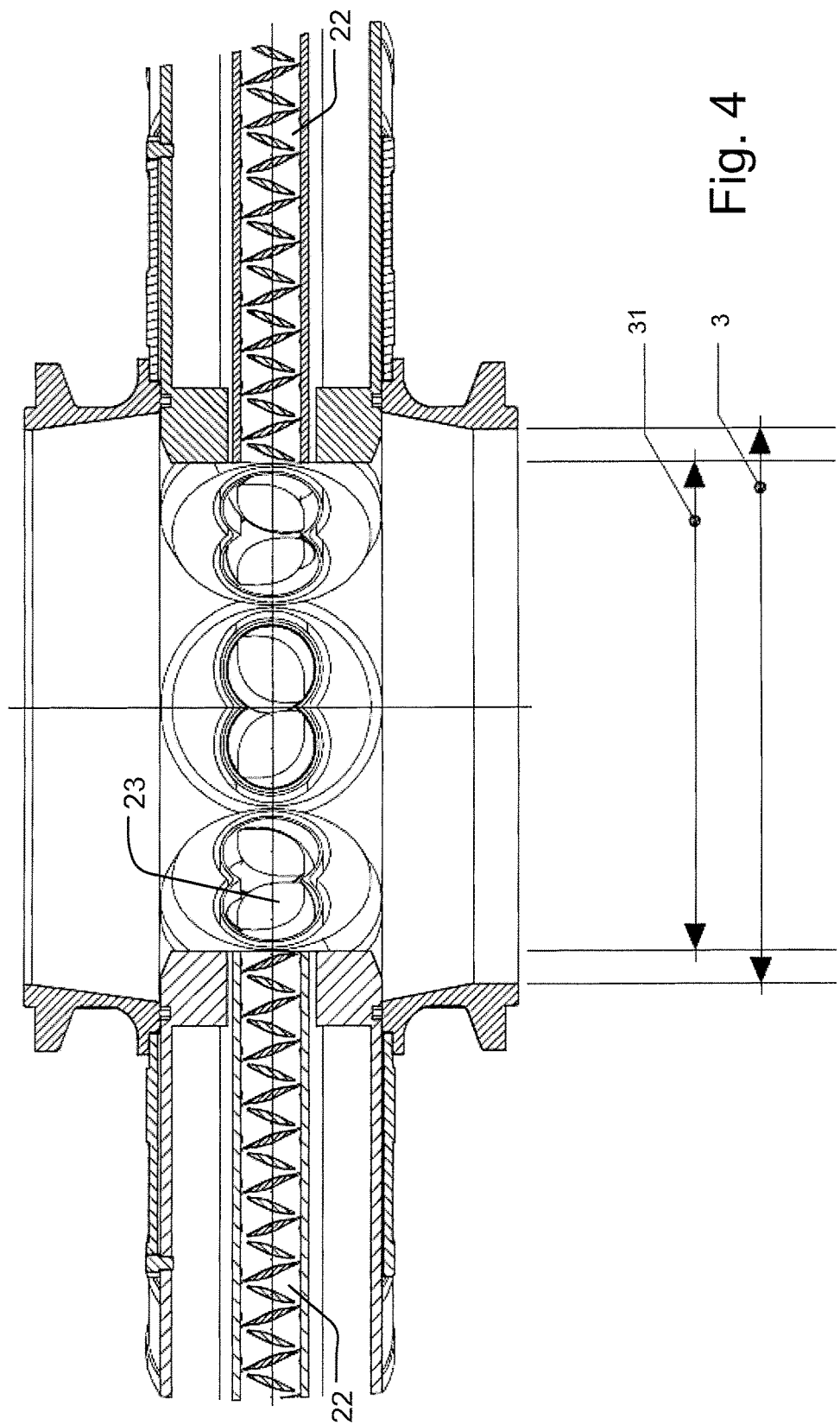
FIG. 4 shows a fragmentary, detail cross-sectional view of and exemplary embodiment of a receiving hopper or receiving container of the feeder module of FIG. 1.

With particular reference to FIGS. 3 and 4, each feeder unit 2 includes a storage hopper 21 to contain material to be processed, a conveyer 22, a discharge end 23, and a weighing cell 24. The conveyer 22 has the function of transporting the material from the storage hopper 21 to discharge the material into a receiving container in a manner to be described in further detail below. Furthermore, it emerges from these Figures that the feeder units 2 are arranged in a single level to discharge into a common receiving container 3.

In the embodiment shown in FIGS. 1 to 4, the feeder units 2 are distributed substantially evenly over 360° in the same level, i.e. on substantially the same horizontal plane. Thus, the feeder units 2 are arranged in a spokes-like configuration, each feeder unit 2 extending radially outwards from an imaginary inner circle 31 defined at the discharge end 23 facing the common receiving container 3 to an imaginary outer circle defined by radially opposite end of each feeder unit. The feeder units 2 are positioned substantially on radii extending from the imaginary inner circle.

The smallest possible dimension of the imaginary inner circle 31, and hence of the receiving container 3, depends on the number of feeder units 2 and of the physical dimensions of the individual feeder units 2. Typical values in embodiments comprising five feeder units, possibly distributed substantially evenly, are a diameter of the imaginary inner circle of 42-100 mm. In an embodiment comprising six feeder units, possibly distributed substantially evenly, the diameter of the imaginary inner circle is typically 50-120 mm. 7 feeders 57-140 mm. In the embodiment shown in FIGS. 1 to 4, where eight feeder units 2 are adapted to be distributed substantially evenly, the diameter of the imaginary inner circle is typically 65 to 150 mm, in the specific embodiment approximately 107 mm. These values are dependent also on the desired clearance of 1-10 mm between parts of neighboring feeder units and the dimensions of the individual parts. In the embodiment shown, the approximate width 26 of the discharge tube of each feeder unit 2 is 40 mm.

The dimensioning of the feeder units 2 of the feeder module 1 depends on the field of application. Sizing may for instance be available as a range, such that each feeder unit 2 in a module 1 is of a different size. In the embodiment shown and described, the dead weight of each feeder unit 2 is below 5 kg, and the capacity of the storage hopper of each feeder unit is less than 2 liters.

Correspondingly, the net weight of the powder to be filled into the storage hop-per 21 of the individual feeder units 2 depend on the volume but also on the kind of pow-der applied. Typically, the maximum volume of powder in the storage hopper lies in the interval 1.6 to 2 liters. The maximum mass flow rate is approximately 50 kg/h.

The ratio of powder weight and the maximum mass flow provide a maximum run time to empty a feeder or a maximum refilling interval pr. hour. Preferably, the arithmetic product of the maximum refilling interval [h] and the dead weight [kg] of each feeder unit 2 is below 0.1 kgh. If the powder density is taken out of the equation and replaced by volume the maximum refilling interval is also the ratio of the hopper volume [L] and the feed rate [L/h]. E.g the capacity of the storage hopper of each feeder unit is less than 1.6 liters. The maximum flow rate is 100 L/h. The maximum refill interval is then 0.016 h. The dead weight of each feeder unit 2 is typically 5 kg.

In the embodiment described, the arithmetic product of the dead weight 5 kg and the maximum refill interval 0.016 h is 0.08 kgh. The arithmetic product is typically below 0.2, preferably below 0.1, most preferably below 0.05 kgh.

Cleaning of at least some parts of the feeder module is advantageously carried out on a regular basis. In order to allow cleaning of in particular the parts in contact with the powder to be processed, the storage hopper, the conveyer and the discharge end of each feeder unit are releasably connected to the weighing cell.

FIG. 4 shows a detail cross section of the receiving hopper or receiving container 3. The discharge tube end 23 of the feeder units 2 with the imaginary circle 31 is smaller than the diameter of the receiving container 3. The discharged powder falls straight into the throat of the receiving container 3 and is substantially not sticking to the inner walls of the receiving container 3.

Figure 5:
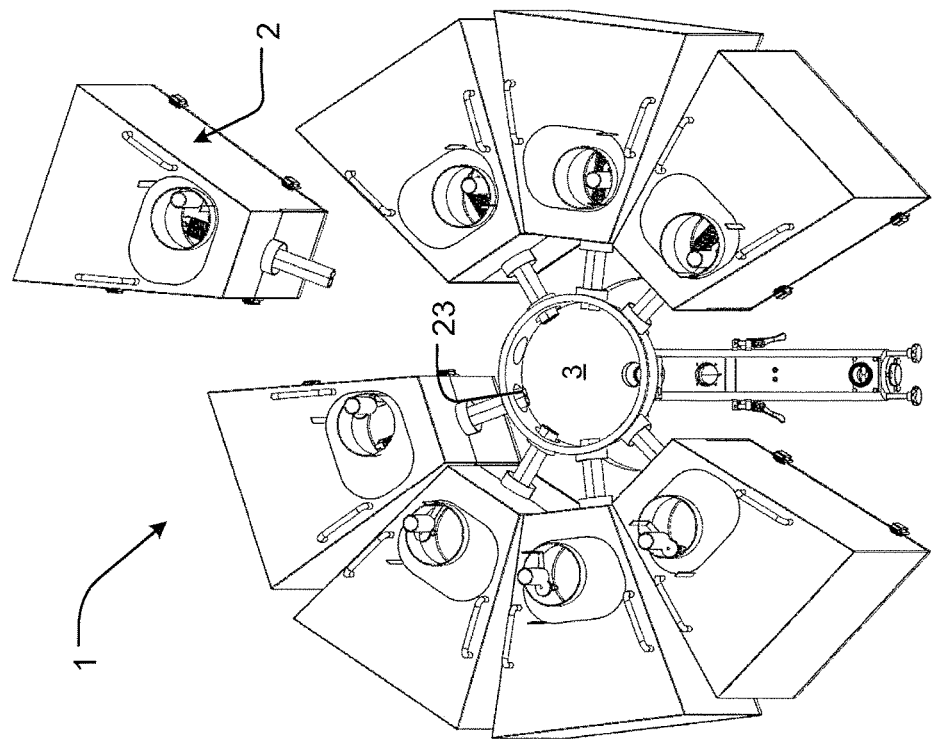
FIGS. 5 and 6 show a perspective view from above a feeder module of another embodiment in two different conditions.
Figure 6:
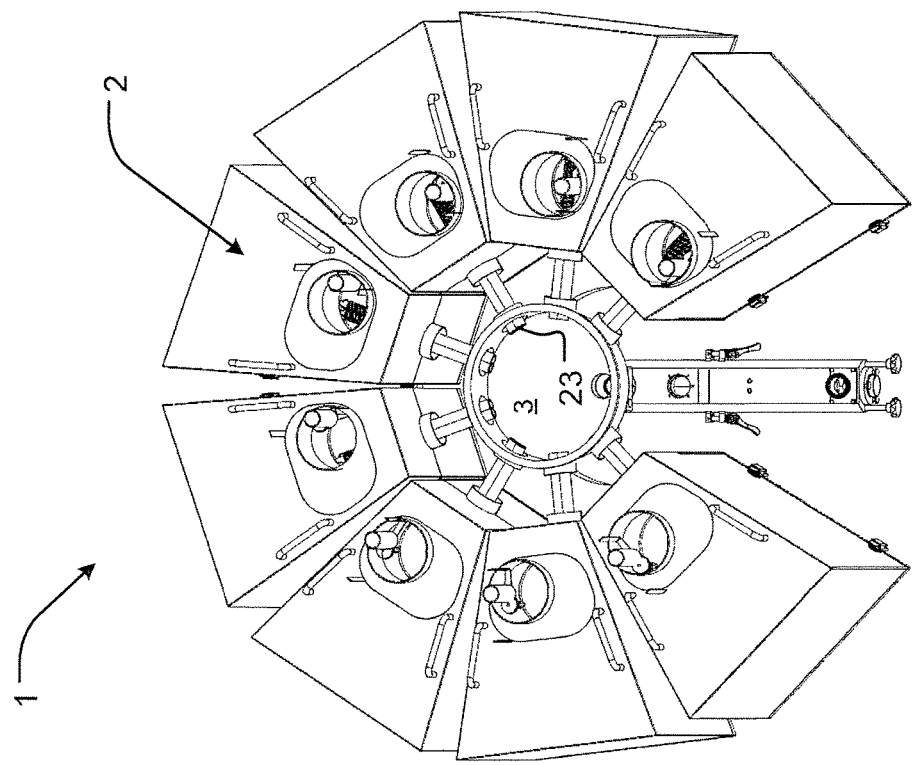

In the embodiment of FIGS. 5 and 6, the configuration of the feeder units 2 of the feeder module is slightly different from that of FIGS. 1 to 4. Here, there are also eight feeder units 2, but they are distributed over only a part of the circle circumscribing the discharge ends 23 and the receiving container, viz. approximately 270°. Detachment of one feeder unit 2, for instance for cleaning purposes, is carried out by detaching the feeder unit 2 from the receiving container 3. This may take place in a contained manner, for instance by other tightening or sealing devices, such as by Layflat tubing (LFT).

Figure 7:
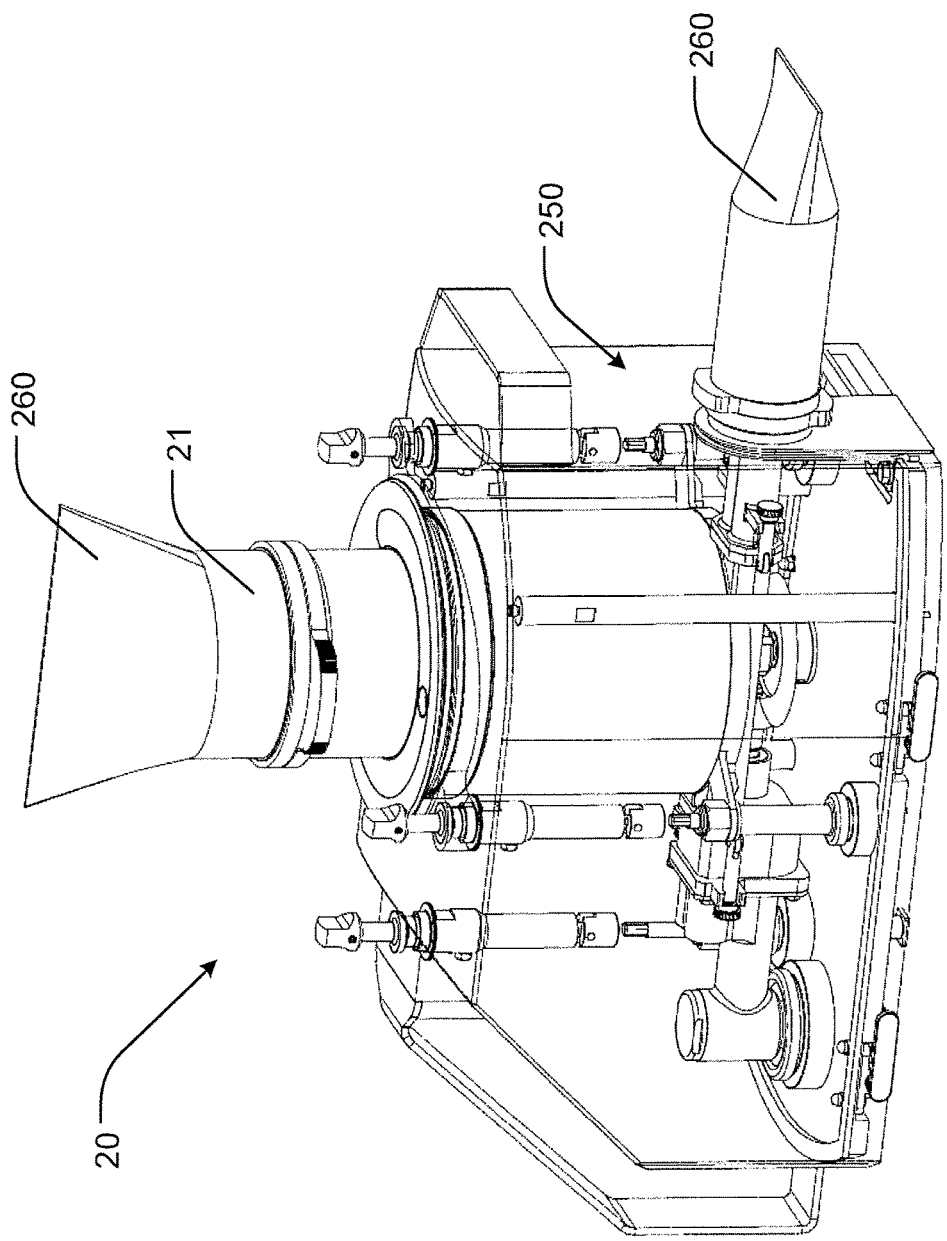
FIG. 7 shows a partially transparent, perspective view of a detail of an embodiment of a feeder module and containment of powder contacting powder pump.

Following detachment of one feeder unit 2, the engagement of the storage hopper, the conveyer and the discharge end 23 with the weighing cell 24 is released to attain the position shown in FIG. 7.

Relative to some prior art devices, it is noted that there is no bellow between the discharge end 23 and the receiving container. Such a bellow has shown to influence the weighing signal due to its stiffness. A casing 250 is provided around the storage hopper, the conveyer 22 and the discharge end 23 of each feeder. The openings in the casing 250 are detached from the weighing cell. The receiving container, which is also detached from the weighing cell, and the feeder part 20 are isolated in a contained way by means of a lay flat tube 260. Lay flat tubes 260 are preferably made of a lightweight material having a very low stiffness, such that the weighing signal is left almost completely unaffected. A lay flat tube 260 may also be provided between the storage hopper 21 and a pre-feeder element (see FIG. 1).

Figure 8C:
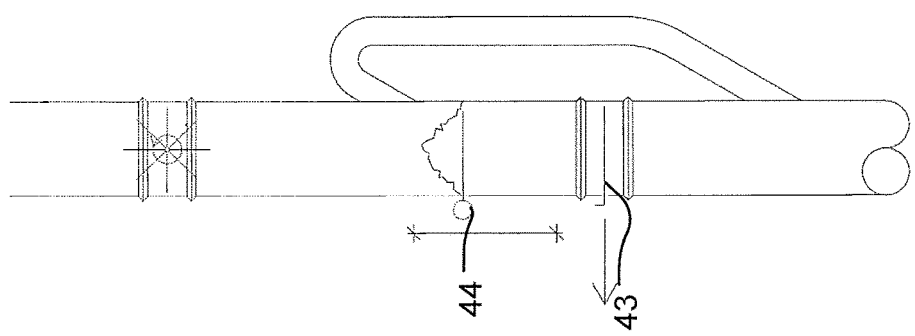
FIGS. 8a-c show fragmentary, side views of a detail of a pre-feeder element of a feeder module.
Figure 8B:
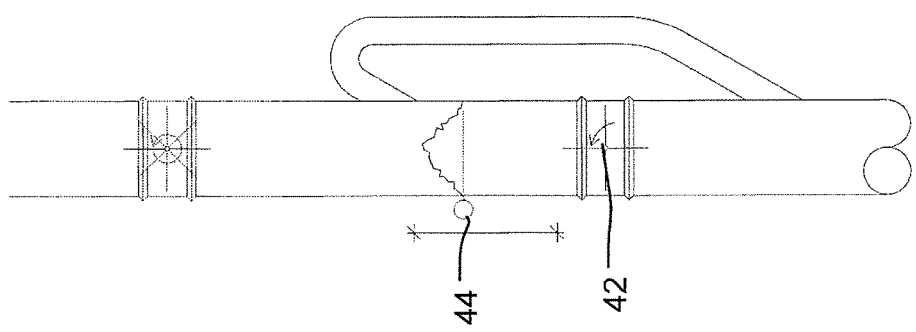
Figure 8A:
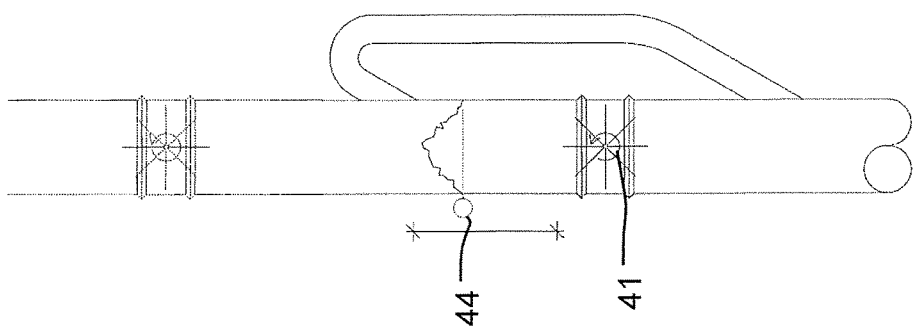

Refilling of the storage hoppers of the feeding units 2 may take place at different points in time, if expedient according to a predefined schedule. The refilling takes place by means of a valve with air compensation, cf. FIGS. 8a-c and part 230 in FIG. 3. Suitable valves are represented by plug valves, rotary dosing valves 41, butterfly valves 42 and slide valves 43. Above the valve a level sensor 44 is provided for use when the weight is fluctuating during refill of the feeder unit 2. The refilling takes place in a contained manner so as to at least assure that no dust enters the surrounding environment by the use of an appropriate seal or tube.

During refilling, special precautions may be taken, such as for instance the use of an algorithm to control dosing during the short refilling time where weighing is paused, this is to compensate for the compacting effect that arises during filling. In the algorithm, a weight is simulated to predict the correct feed factor, and once the seal is released, the weight of the powder in the storage hopper is corrected. Particular details of the refilling procedure will be described in further detail below.

Figure 9A:
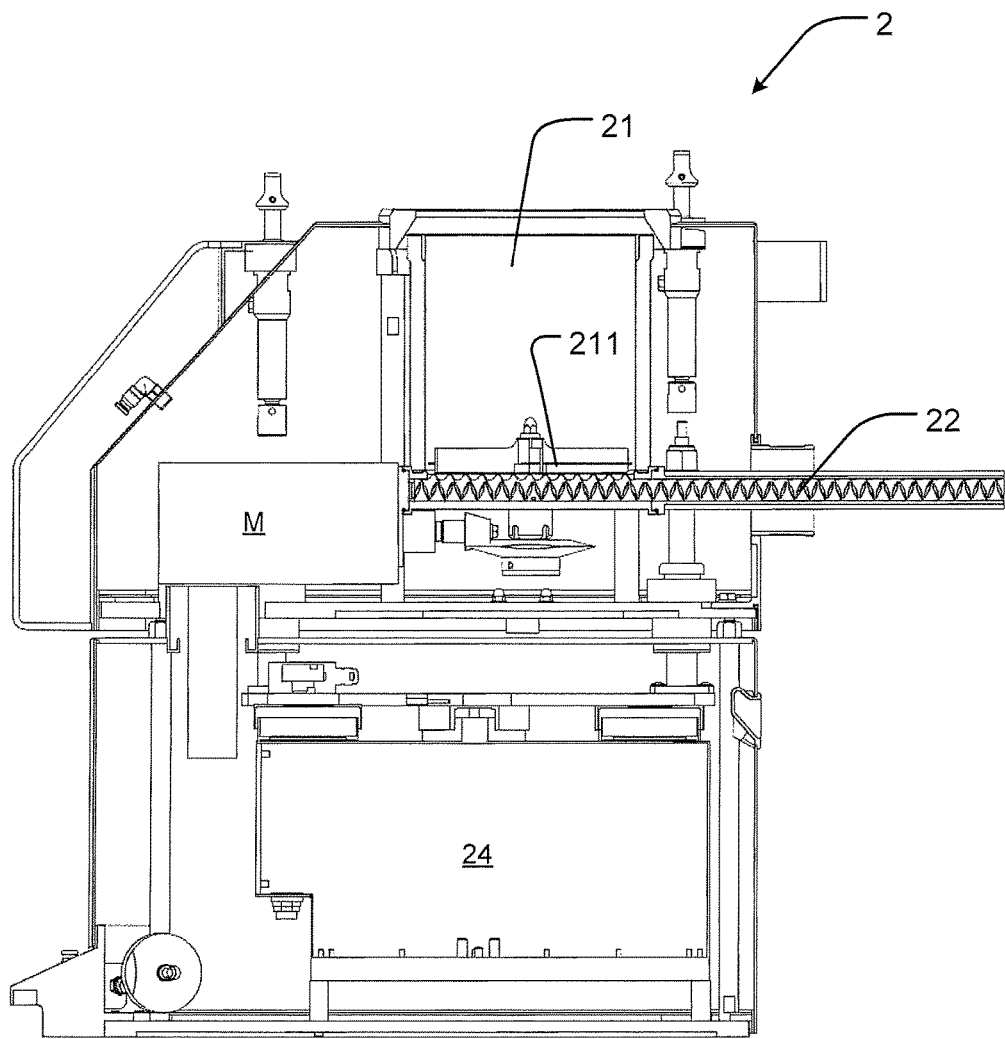
FIG. 9a shows a vertical cross-sectional view of an embodiment of a feeder module.
Figure 9B:
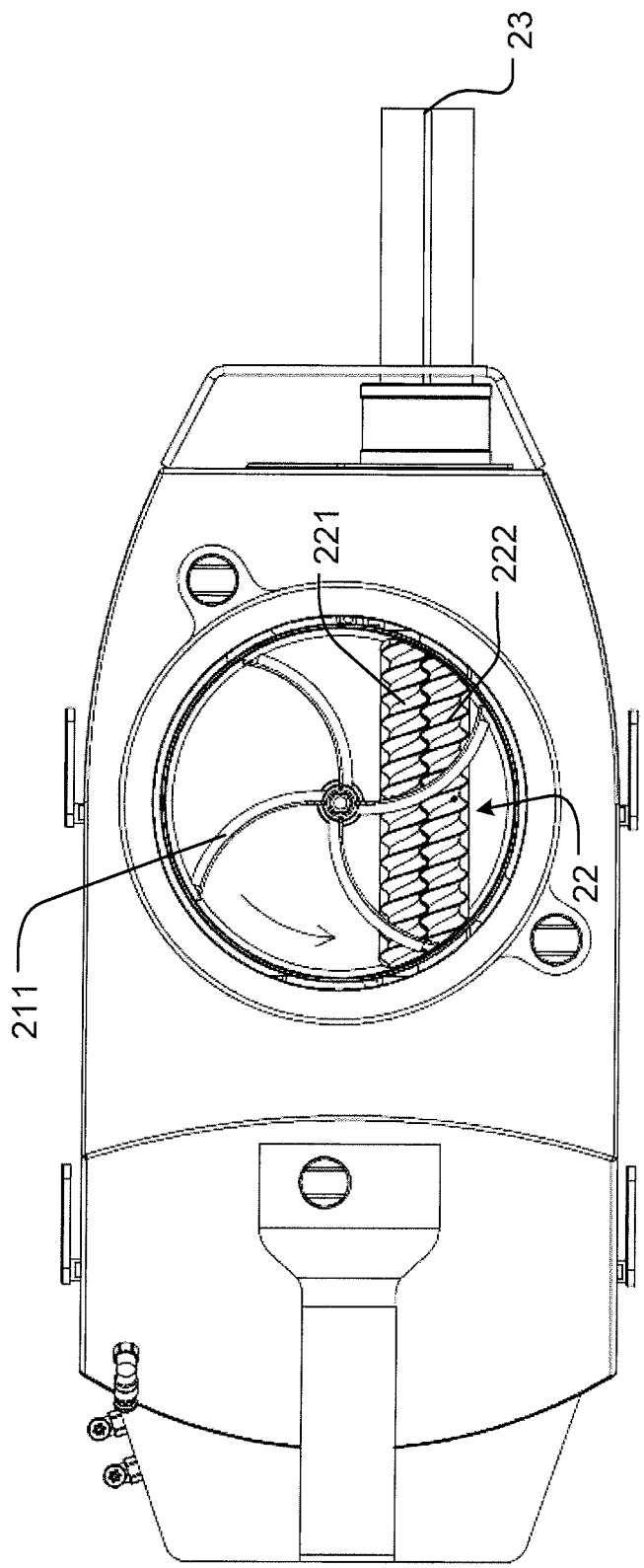
FIG. 9b shows a top plan view of a feeder unit.
Figure 9C:
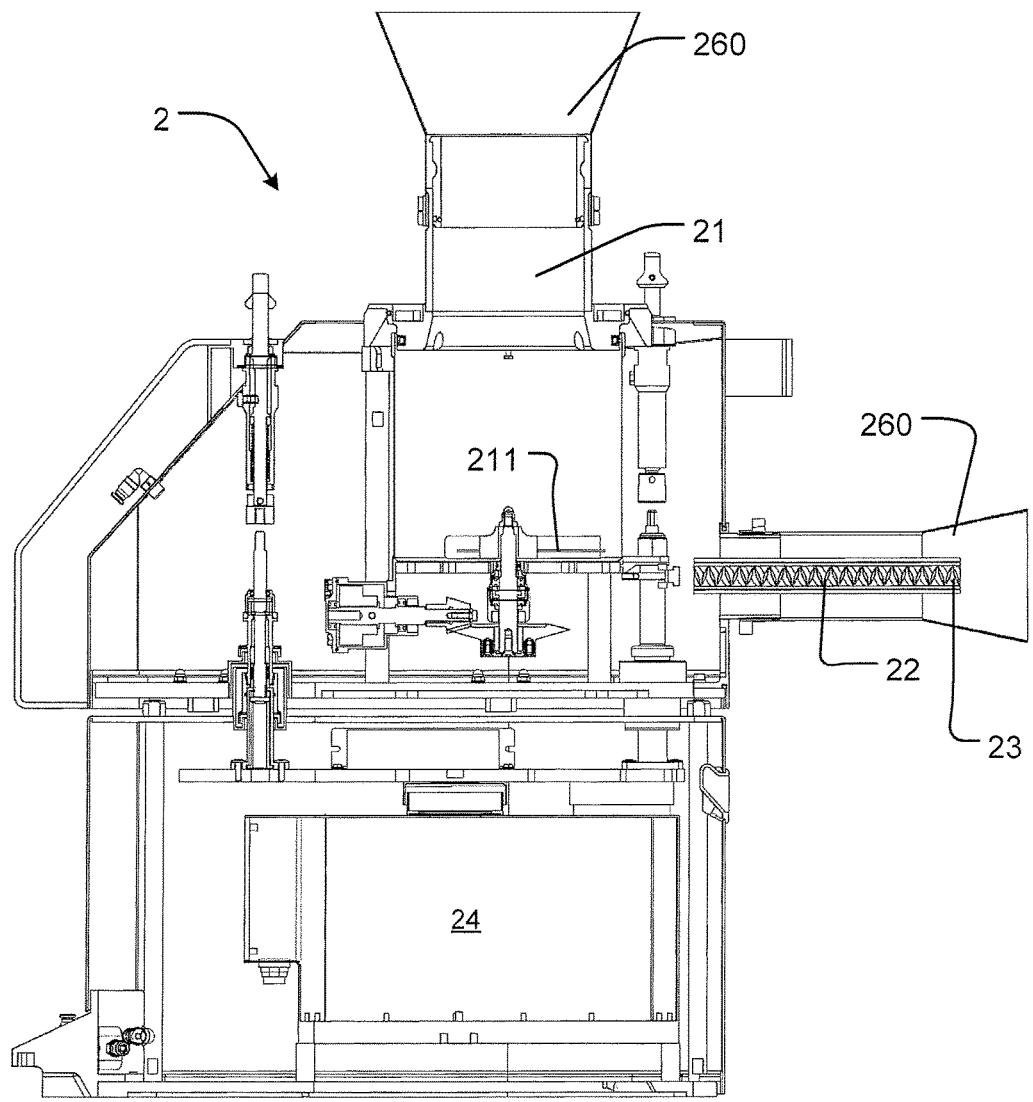
FIG. 9c shows a vertical cross-sectional view of a feeder module.

Referring in particular to FIGS. 9a-c, the storage hopper 21 may be supplemented by a stirrer device 211 to break any bridges formed in the powder and to ensure that the conveyer 22 is fed properly. The conveyer 22 is in the embodiment shown a twin screw conveyor. Compared to FIG. 9a, the feeder unit 2 is additionally provided with lay flat tubing 260 and the receiving opening of the storage hopper 21 and at the discharge end 23.

Figure 10:
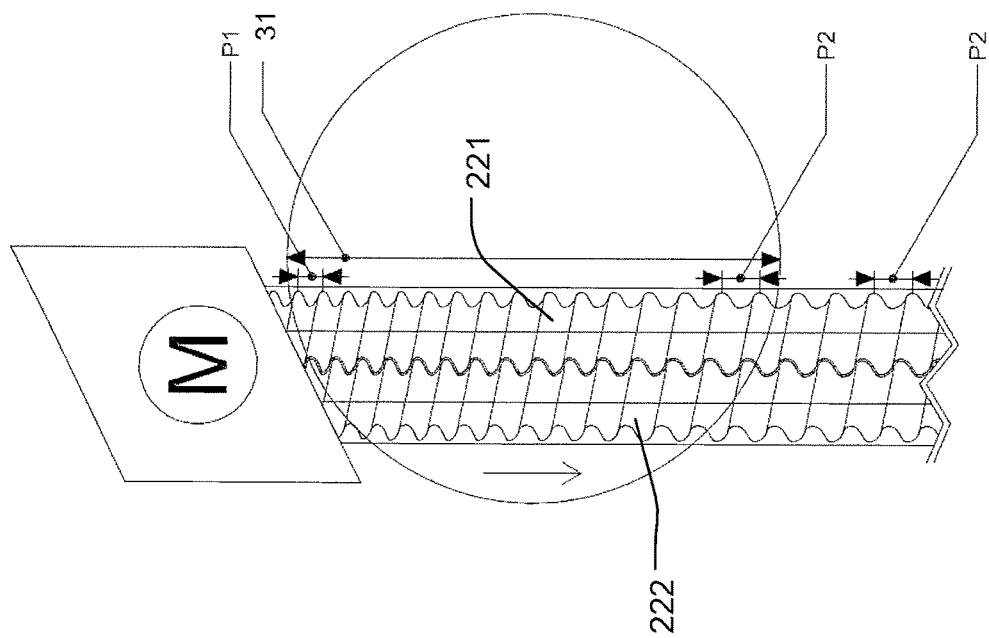
FIGS. 10 and 11 show fragmentary, partially transparent plan views of a detail of two different embodiments of a feeder module.
Figure 11:
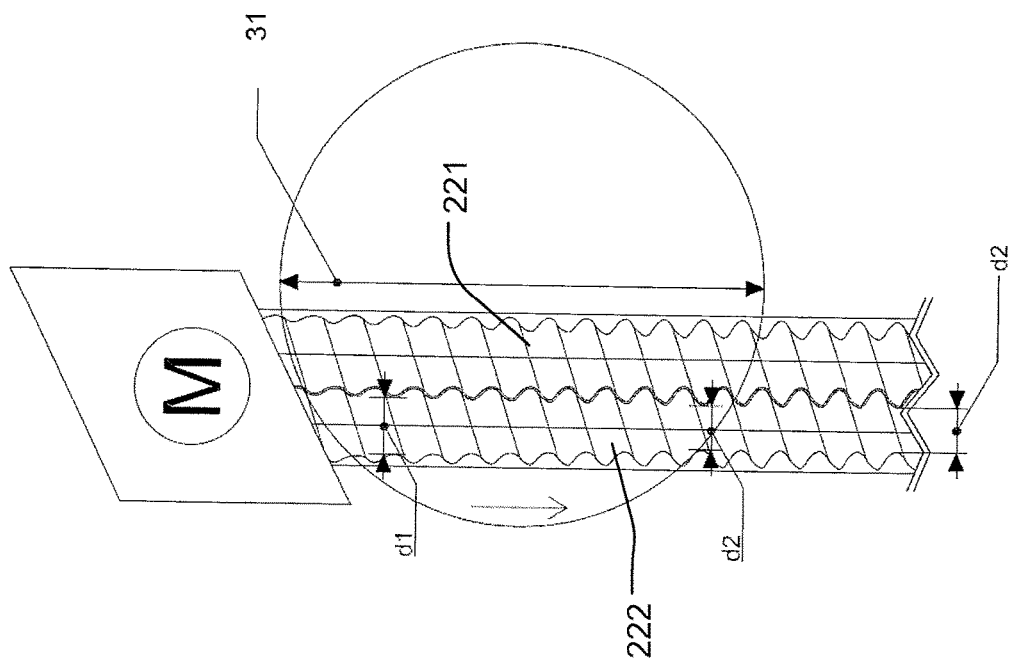

In the embodiment shown in FIG. 10, both of the concave screws 221 and 222 of the twin screw conveyor 22 have a variable pitch along its length, a first pitch p1 and a second pitch p2, being different from the first pitch P1. The conveyer 22 is driven by a motor M. In this embodiment the diameter of each screw is constant. In the embodiment of FIG. 11, the pitch of each screw is constant, whereas the diameter of the screws is variable along the length shown as diameter d1 and diameter d2. It is also possible to have one or more screws with both a variable pitch and a variable diameter.

For both FIGS. 10 and 11 the material to be conveyed moved in the direction of the arrow away from the motor M and into the imaginary circle 31.

Furthermore, although not shown in the drawings, the feeder module may comprise a number of additional features, such as analysis and control systems, loading and discharging stations etc.

As the feeder unit of the feeder module according to the invention has a storage hopper of a limited volume, a rapid or high frequency refilling system is provided.

Typically, feeders of a larger volume are refilled 4 to 8 times per hour. During refilling, the powder which is dropping into the storage hopper causes disturbances on the weight signal (due to the impact forces of the powder) over a period which is equal to the sum of the powder drop time and scale stabilization time. Together with the time of rolling average filters this usually takes 30 s up to 60 s to get a stable weighing signal after a refill or top-up. During this time the feeder is running in a volumetric mode. The screw speed is defined by the Feed Factor curve, the feed factor being defined as the equivalent of the weight per screw revolution, and the accuracy depending on how good the curve is fitting to the reality.

Typical values of the refilling frequency of the feeder module according to the invention are one time per minute at a feed rate of 50 kg/h, i.e. mass flow 5 kg/h refill after 10 min. Due to its reduced weight and dynamic properties, the feeder module stabilizes in 2 to 4 seconds at a feed rate of 50 kg/h.

In general, the summarized refill time of both systems is similar, but the accuracy on the mass flow during refilling volumetric mode (RMS error) is much better compared to conventional top-up systems.

The principle underlying the refilling system of the feeder module according to the invention is different from others as it is based on refilling each time the same amount of power under the same conditions. The refill system has either a weighing scale or a level sensor integrated combined with a volumetric dosing valve. The system itself acts as a (pre) feeder and stores the number of impeller turns together with a level or a weight.

Such a refill or top-up system can also be used for material determination using the feeder data. Furthermore, it can be set to sense material variations. As the powder dosing valve always discharges in the center of the top-up tube, the shape of the powder stack is constant in the same area. During the powder drop, the powder at the bottom of the hopper is more compacted than the powder at the top of the hopper. However, the powder volume in the discharge tube is still not compacted. The screw speed remains unchanged until the fresh (i.e. more compacted) material is coming to the discharge opening. Each refill is reproducible and the system learns and converges to the optimal speed of the screws. Furthermore, analysis of feeder data with fast Fourier Transform (FFT) may be applied to determine the material and differentiate between different types of material (eg. batch to batch variation). Eventually, the feeder data may be used to calculate theoretical compositions and confirm BU and Assay over specified time periods.

During operation, the feeder module is subjected to a number of external and internal disturbances. The disturbances normally include mechanical vibrations, wind load, bellow deformation forces etc. falling into one of two main types, viz. deterministic disturbances, which can be filtered, and non-deterministic disturbances, the effect of which must be reduced in other ways. In order to reduce the external cyclic disturbances, an Active Vibration Compensation (AVC) scale is integrated in the feeder module and compensates in real time the weighing signal.

This improves the accuracy on the mass flow even further. In order to reduce the effect of the internal cyclic disturbances, due to gears, agitator in hopper etc., special algorithms are used for real time noise cancelling, according to the "anti-sound" principle, to dampen noise from screws, gearbox etc. without time delay.

Due to the low dead weight of the feeder unit, and the small hopper volume thus limiting the weight of the powder present in the hopper, and the dynamic EMFR weighing scale, the feeder module according to the invention is dynamically more precise and faster responding compared to others. For instance, the recovery from non-cyclic external disturbances will only take about 2 to 4 seconds.

As further features, in order to increase the accuracy even further, a controller adapted to store a conveying parameter together with a level or a weight may be provided, and the feeder unit may further comprise a sensor for sensing material variations.

Operation of the feeding unit may take place by the method according to the invention to be described in the following:

The method is intended for discharging a constant mass flow of one or more powders into a receiving container. Primarily, the method forms part of a process for processing pharmaceutical products, but may also be applied in other fields. The method is suitable for being operated in a feeder unit 2 as described in the above and comprises the steps of:

providing a feeder unit 2 with a storage hopper 21, a weighing cell 24, a convey-er 22, and a discharge end 23, connecting the storage hopper 21 to a refilling system with a refilling valve 41, 42, 43, connecting the refilling valve to a level or weight indicator 44, the level or weight indicator 44 being above the refilling valve 41, 42, 43, connecting the discharge end 23 to a receiving container 3, refilling the storage hopper 21 intermittently at predefined intervals, storing data during refilling, wherein during refilling, the refilling valve 41, 42, 43 dispenses the same amount of powder into the storage hopper 21, and the conveyer 22 is operated according to the data collected during previous re-fills.

Typically, the storage hopper 21 is refilled 40 to 80 times per hour, preferably 50 to 70 times per hour. The stabilizing time after each refill is in the range 2 to 4 seconds.

A working space is defined by the value resulting from the formula: The arithmetic product of the dead weight [kg] of each feeder unit and the refilling interval [h] is below 0.2 or even below 0.1. Due to the low powder mass in the hopper a very sensitive scale can be used which leads to a very high accuracy. The low powder mass makes a more frequent refilling necessary.

Other aspects of the configuration of the feeder module are the subject of Applicant's co-pending application filed on the same day as the priority application of the present application, which co-pending application was assigned International Application No. PCT/IB2012/052804 and was published under International Publication WO 2013/182870 A1, and the contents of which are incorporated by reference.

According to need (i.e. an indication of a storage hopper being empty) or as a result of a pre-programmed schedule, the storage hoppers of the respective feeder units are refilled intermittently as described in the above.

In order to clean the parts of the feeder module in contact with the powder(s), the method may include the further steps of detaching the storage hopper, the conveyer and the discharge end of each feeder unit from the weighing cell, and cleaning the storage hopper, the conveyer and the discharge end of each feeder unit in a contained manner.

The invention should not be regarded as being limited to the embodiments shown and described in the above. Several modifications and combinations are conceivable within the scope of the appended claims.

What is claimed is:

1. A method for processing pharmaceutical powders, which comprises:
   providing a feeder module including a plurality of feeder units;

providing each feeder unit with a storage hopper, a weighing cell, a conveyer, and a discharge end;
connecting the storage hopper of each feeder unit to a refilling system with a refilling valve;
connecting the refilling valve to at least one of a level or weight indicator disposed above the refilling valve;
connecting the discharge end of each feeder unit to a common receiving container;
refilling the storage hopper of each feeder unit with a powder intermittently 40 to 80 times per hour;
storing data about the powder filled in the feeder unit during refilling;
transporting powder from the storage hopper of each feeder unit with the respective conveyer; and
discharging powder from each feeder unit into the common receiving container, wherein:
during each refilling of the storage hopper of each feeder unit, the respective refilling valve dispenses approximately the same amount of the powder into the storage hopper; and
during the step of transporting the powder from the storage hopper of each feeder unit, the conveyer is operated according to the data collected during previous refills.

2. The method according to claim 1, wherein the storage hopper is refilled 50 to 70 times per hour.

3. The method according to claim 1, further defining a stabilizing time of the feeder module and wherein the stabilizing time after each refill is in a range of 2 to 4 seconds.

4. The method according to claim 1, wherein the storage hopper of each feeder unit is provided with a predefined volume to define a capacity of below 10 liters.

5. The method according to claim 4, wherein the maximum volume of powder in the storage hopper in each feeder unit lies in a range of 1.6 to 2 liters.

6. The method according to claim 4, wherein the powder is transported from the storage hopper of each feeder unit to the receiving container at a predefined maximum flow rate of below 100 liters per hour.

7. The method according to claim 6, wherein a maximum refilling interval in h is defined by a ratio of a volume of the storage hopper and a maximum flow rate.

8. The method according to claim 7, wherein each feeder unit is provided with a dead weight in a range of 1 to 8 kg.

9. The method according to claim 8, wherein:
a working space in kgh is defined by an arithmetic product of the dead weight in kg of each feeder unit and the refilling interval in h; and
the working space is below 0.2 kgh.

10. The method according to claim 9, wherein the working space is below 0.1 kgh.

11. The method according to claim 1, wherein the receiving container is connected to a granulator and further comprising the step of granulating the mixture of the one or more powders to provide a granulated mixture.

12. The method according to claim 11, wherein the receiving container is connected to a tablet press and further comprising the step of tabletting the mixture of the one or more powders or granulated mixture to provide a tabletted pharmaceutical product.

13. A feeder module for use in the method according to claim 1, the feeder module comprising:
a plurality of feeder units, each feeder unit including a storage hopper, a weighing cell, a conveyer, and a discharge end;
a refilling system including a refilling valve and at least one of a level or weight indicator disposed above the refilling valve, the refilling system being connected to the storage hopper of each feeder unit;
a common receiving container connected to the discharge end of each feeder unit; and
the plurality of feeder units are two to eight feeder units disposed in a spokes-like configuration, each feeder unit extending radially outwards from an imaginary inner circle defined by the discharge ends of the feeder units in the common receiving container to an imaginary outer circle defined by radially opposite ends of the feeder units, the feeder units being positioned substantially on radii extending from the imaginary inner circle.

14. The feeder module according to claim 13, which further comprises a controller programmed to store a conveying parameter together with at least one of a level or a weight.

15. The feeder module according to claim 13, wherein the weighing cell of each feeder unit is a weighing cell with Electro Magnetic Force Restoration (EMFR).

16. The feeder module according to claim 13, wherein the storage hopper, the conveyer, and the discharge end of each feeder unit are releasably connected to the weighing cell.

17. The feeder module according to claim 13, wherein at least one of the conveyers of the feeder units are twin screw conveyors.

18. The feeder module according to claim 17, wherein at least one of:
at least one of the screws of the twin screw conveyor has a variable pitch along its length underneath the storage hopper;
at least one of the screws has a variable diameter along its length underneath the storage hopper; and
both of the screws have a variable diameter along its length underneath the storage hopper.

19. The feeder module according to claim 13, which further comprises a controller programmed to process weight signals and compensate for external forces.

20. The feeder module according to claim 13, which further comprises a sensor configured to sense material variations.

21. The feeder module according to claim 13, wherein the storage hopper, the conveyer, and the discharge end of the feeder unit are contained and isolated from the weighing cell.

22. The feeder module according to claim 21, wherein the discharge end of each feeder unit is connected to the receiving container by a lay flat tube.

23. The feeder module according to claim 21, wherein each feeder unit has a pre-feeder element and which further comprises a lay flat tube between the storage hopper and the pre-feeder element of each feeder unit.

24. The feeder module according to claim 23, which further comprises a casing around the storage hopper, the conveyer and the discharge end of each feeder unit.

25. The feeder module according to claim 13, wherein a diameter of the imaginary inner circle is smaller than a diameter of the receiving container.

26. The feeder module according to claim 13, which further comprises an active vibration compensation scale integrated in the feeder module.

27. The feeder module according to claim 13, wherein the storage hopper is provided with a stirrer device.

* * * * *